April 30, 1929.  F. H. BRONNER  1,711,222
PERSONNEL INDICATOR
Filed Sept. 27, 1927
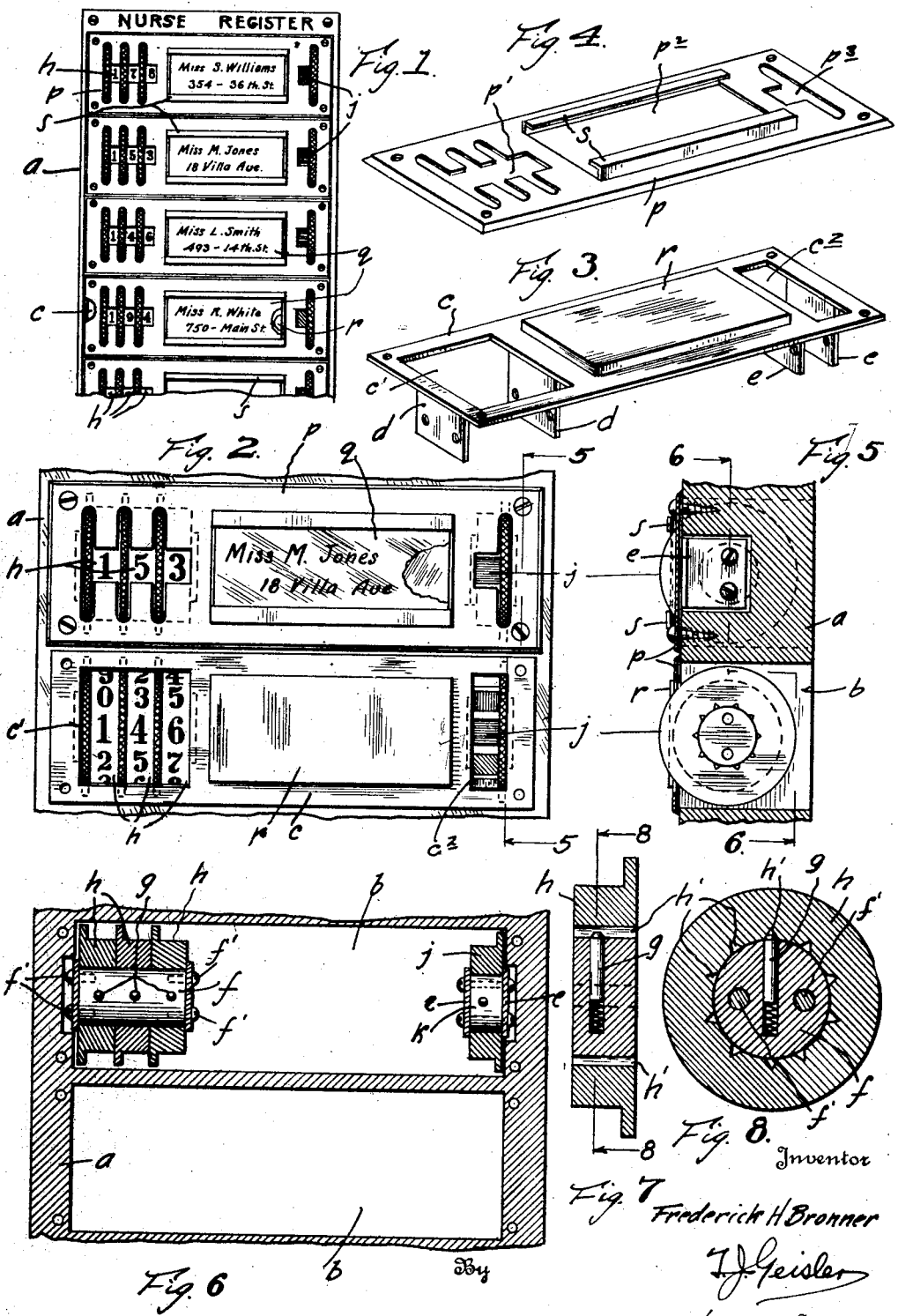
Inventor
Frederick H Bronner
by J. F. Geisler
Attorney Patented Apr. 30, 1929.

1,711,222

UNITED STATES PATENT OFFICE.

FREDERICK H. BRONNER, OF PORTLAND, OREGON.

PERSONNEL INDICATOR.

Application filed September 27, 1927. Serial No. 222,251.

My invention relates to personnel indicators, and especially to such indicators as adapted for use in hospitals, clubs, and the like.

The object of my invention is to provide a simple and efficient personnel indicator which is easily kept up to date, and which will tell at a glance the employment status of the nursing staff of a hospital. In similar manner my device may also be used to indicate the presence of the members of a club, or other organization, and the particular room in the club quarters where the member may be found.

For example, my indicator, as adapted for use in hospitals for the nursing staff may be arranged to indicate whether a particular nurse is on duty in, or outside of, the hospital, and if on duty in the hospital, to indicate the room number where she may be found, also to indicate whether she is on day or night duty, or out, or resting. And if not on duty in the hospital to indicate whether she is employed on an outside case, or is available for a new case, also to indicate that the nurse is not available for the time being, because out of the city.

At present there are no means within my knowledge which are adapted to serve these purposes, for conveniently and efficiently indicating the employment status of the nurses registered at a hospital; in consequence there is always more or less confusion, and delay, in locating a particular nurse, and then discovering if the nurse is, or is not available for duty.

A further object of my invention is to provide an indicator comprising a number of individual and independent units, one for each person whose name appears on the indicator, and which will be operated by the persons individually, easily, and quickly as they come in, or go out, or go on or off duty.

A still further object of my invention is to provide a personnel indicator, each unit of which may be used successively by different persons by the substitution of one name card for another.

I attain my objects in an indicator comprising a name plate and a series of revoluble dials independently adjustable, and provided with means tending to restrain the movement of said dials when adjusted to display a selected indicia, whereby the indicia indicated will be normally in alinement with the name plate and the information so displayed will be easily and accurately understood.

These and other incidental features and the details of construction of my personnel indicator will hereinafter be described in details with reference to the accompanying drawings:

Fig. 1 shows a fragmentary front elevation of a number of my indicators and illustrates the information contained thereon;

Fig. 2 shows an enlarged fragmentary front elevation of two indicators and illustrates one with the cover plate removed disclosing certain details of construction;

Fig. 3 shows a perspective view of the base of my indicator;

Fig. 4 shows a perspective view of the cover plate removed from the indicator;

Fig. 5 shows a section taken on the line 5—5 of Fig. 2, and illustrates the details of construction;

Fig. 6 shows a section on the line 6—6 of Fig. 5, and illustrates further details of construction;

Fig. 7 shows an enlarged transverse section of the color symbol dial; and

Fig. 8 shows a section taken on the line 8—8 of Fig. 7, looking in the direction of the arrows, and illustrates further details of construction of the color symbol dial.

Referring now to the figures, my personnel indicator comprises a supporting frame $a$ in which my indicators will be arranged.

Each indicator unit comprises a rectangular base plate $c$, adapted to be affixed in recesses $b$ provided in the frame $a$.

Rectangular recesses $c'$ and $c^2$ are provided adjacent each end and downwardly extending parallel flanges $d$ and $e$ are provided at opposite sides of the recesses $c'$ and $c^2$, respectively.

A spindle $f$ is fixed by screws $f'$ between the lugs $d$ and is provided with spring seated catches or bolts $g$, one for each dial to be rotatably mounted thereon.

A series of number dials $h$, in this case three, are rotatably mounted on the spindle $f$, and are provided in their bores with spaced notches or recesses $h'$ in which the spring bolts $f'$ are adapted to releasably engage successively the recesses $h'$ in the bore of their respective number dials.

The number dials are provided on their peripheries with figures from 0 to 9 inclusive, which are arranged in radial alinement with the notches $h'$ so that each dial will tend to stop as a figure is brought to the front.

By providing three number dials, a three place figure may be displayed at the left of the base plate, thus showing for instance a room number.

At the other end of the plate in the opening $c^2$ a similar single dial $j$ is similarly mounted, on the spindle $k$, between the lugs $e$ and on the periphery of this dial are provided spaced sections of different colors, which may be used as symbols to denote the location or employment of a person in a hospital, club, or the like.

I have found it convenient to use the following color smybols when my indicator is to be used in hospitals for the nursing staff.

Yellow to indicate "available for a new case."

Blue to indicate "night duty."

Green to indicate "night duty, out for rest period."

White to indicate "day duty."

Red to indicate "day duty, out for rest period."

Black to indicate "out of city."

A cover plate $p$ is provided to be fixed over the base $c$ which is provided with a suitable opening $p'$ to allow the figures on the left to be exposed, which would indicate, for instance, a room number. A central rectangular opening $p^2$ is provided in which a name card is to be inserted. The opening $p^2$ may be protected if desirable by a transparent cover $q$, to protect the name card from becoming soiled.

Also a similar opening $p^3$ is provided on the right of the central opening $p^2$ through which the dial bearing the color symbols will be exposed.

The opening $p^2$ in the cover plate $p$ is provided on its longest edges with overturned flanges $s$ forming grooves with a raised portion $r$, provided on the base plate $c$, corresponding in size to the opening $p^2$, which serves to hold the name card closely and securely against the flanges $s$ of the cover plate.

By this arrangement and construction, for example, a nurse on arriving at the hospital and learning that her patient is assigned to room 153, Fig. 2, would operate the dials of her indicator to indicate such room number and then would operate the color symbol dial to show blue, that she was on night duty, if such was the case.

Later, when her patient was discharged, and she was available for a new case, she would turn the room numbers to zero and the color symbol dial to yellow, indicating that she was available for a new case, or, if she was leaving the city, she would turn the color symbol dial to black, showing that she was not available for a new case.

I claim:

A device of the character described comprising a body frame provided with a series of recesses, a base plate affixed in each recess, the base plate provided with a central flat surface, dial elements located in each side of said surface in said base plate, a cover plate securing said dial elements in place on the base plate and provided with means cooperating with said surface for removably holding a card, the dial elements projecting and being operable through said cover plate.

FREDERICK H. BRONNER.